United States Patent

Kim et al.

Patent Number: 5,612,836
Date of Patent: Mar. 18, 1997

[54] APPARATUS FOR GUIDING A TAPE IN A VIDEO CASSETTE TAPE RECORDER

[75] Inventors: Tae-Hyoung Kim, Seoul; Eung B. Kim, Kyungki-do, both of Rep. of Korea

[73] Assignee: LG Electronics Inc., Rep. of Korea

[21] Appl. No.: 406,014

[22] Filed: Mar. 16, 1995

[30] Foreign Application Priority Data

Mar. 18, 1994 [KR] Rep. of Korea ............... 5558/1994

[51] Int. Cl.$^6$ ............................................. G11B 5/027
[52] U.S. Cl. ................................................. 360/85; 360/84
[58] Field of Search ................................. 360/85, 95, 84; 242/354, 354.1, 354.2

[56] References Cited

U.S. PATENT DOCUMENTS

| | | | |
|---|---|---|---|
| 4,912,578 | 3/1990 | Katohno et al. | 360/85 |
| 5,381,283 | 1/1995 | Lee | 360/85 |
| 5,459,626 | 10/1995 | Lee et al. | 360/85 |

*Primary Examiner*—Jefferson Evans
*Assistant Examiner*—Adriana Giordana
*Attorney, Agent, or Firm*—Ostrolenk, Faber, Gerb & Soffen, LLP

[57] ABSTRACT

An improved apparatus for guiding a tape in a video cassette tape recorder capable of advantageously protecting a tape from being caught at a guide pole of a take-up arm during an ejection operation of a cassette, which includes a pinch gear rotatably mounted on a predetermined portion of a stationary base plate and driven by a force transferred from a motor mounted on a predetermined portion of the stationary base plate; an intermediate gear intermeshed with the pinch gear and mounted on a predetermined portion of the stationary base plate and driven by a force transferred from the pinch gear; a cam gear mounted on a predetermined portion of the stationary base plate and intermeshed with the intermediate gear and having a cam groove formed on the upper surface thereof and driven by a force transferred from the intermediate gear; a three-branched loading intermediate member, in which a center portion is pivoted at a predetermined portion of the stationary base plate, having a first branch end having an downwardly extended pin slidably fitted into and travelling along the cam groove for receiving a predetermined force from the cam gear, an inwardly curved second branch end and a third branch end having a geared portion; and a take-up arm in which one end thereof is provided with a guide pole and the other end thereof is provided with a semicircular activating bracket and pivoted at a predetermined portion of the stationary base plate.

9 Claims, 6 Drawing Sheets

APPARATUS FOR GUIDING A TAPE IN A VIDEO CASSETTE TAPE RECORDER

BACKGROUND OF THE INVENTION

1. Field of the Invention

The present invention relates to an apparatus for guiding a tape in a video cassette tape recorder, and in particular to an improved apparatus for guiding a tape in a video cassette tape recorder capable of advantageously protecting a tape from being caught at a guide pole of a take-up arm when a cassette is ejected from a video cassette tape recorder.

2. Description of the Conventional Art

Figure 1:
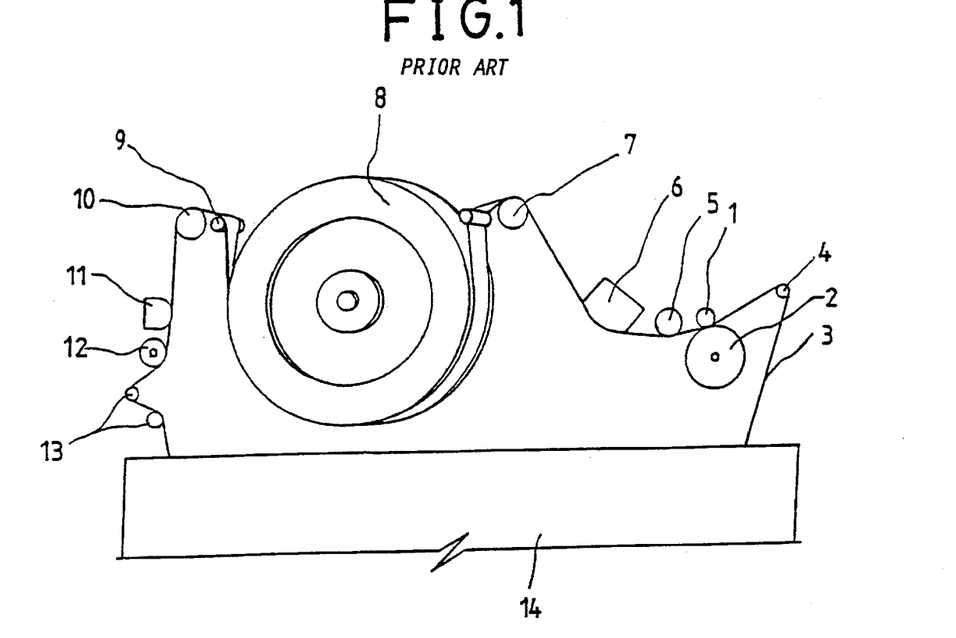
FIG. 1 is a top view showing a partial construction of a conventional apparatus for guiding a tape in a video cassette tape recorder for showing a state of tape running therein.

Conventionally, as shown in FIG. 1, in a video cassette tape recorder a tape 3 is fed through a take-up arm 4, a pinch roller 2, a capstan motor shaft 1, a first tape running guide 5, an audio control head 6, a take-up impedance roller 7, a dram 8, a supply loading post 9, a supply impedance roller 10, a erasing head 11, a second tape running guide 12, and a pair of third tape running guides 13.

Figure 2A:
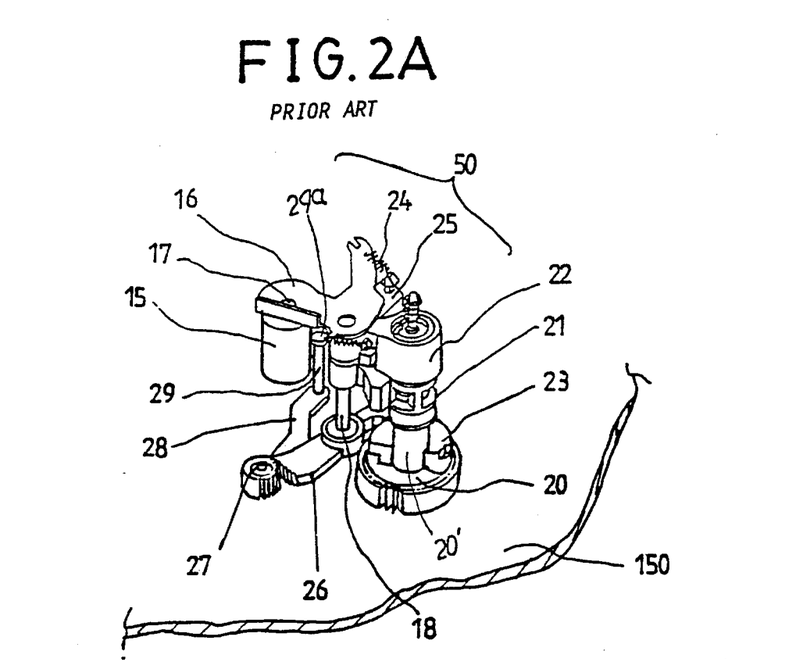
FIG. 2A is a perspective view showing a construction of a conventional apparatus for guiding a tape in a video cassette tape recorder when a guide pole of a take-up arm is at an initial stage before a cassette is loaded into the video cassette tape recorder.
Figure 2B:
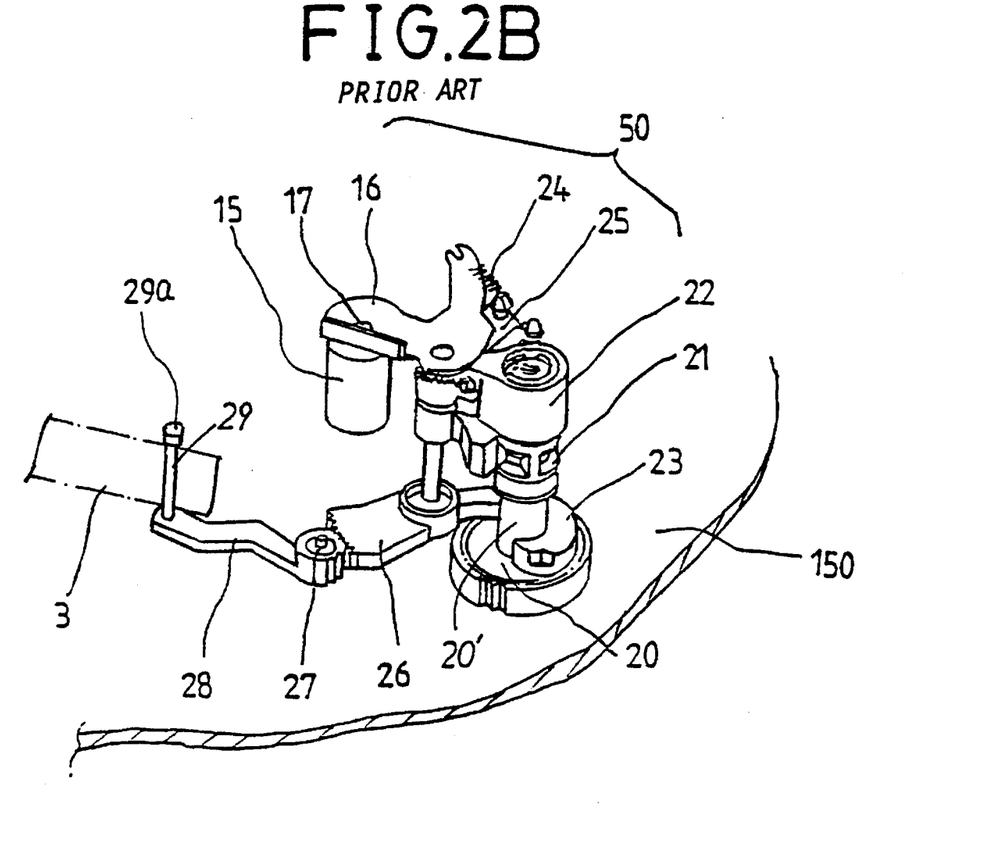
FIG. 2B is a perspective view showing a construction of a conventional apparatus for guiding a tape in a video cassette tape recorder when a guide pole of a take-up arm is positioned where the cassette is placed for guiding a tape toward a pinch roller assembly.
Figure 3:
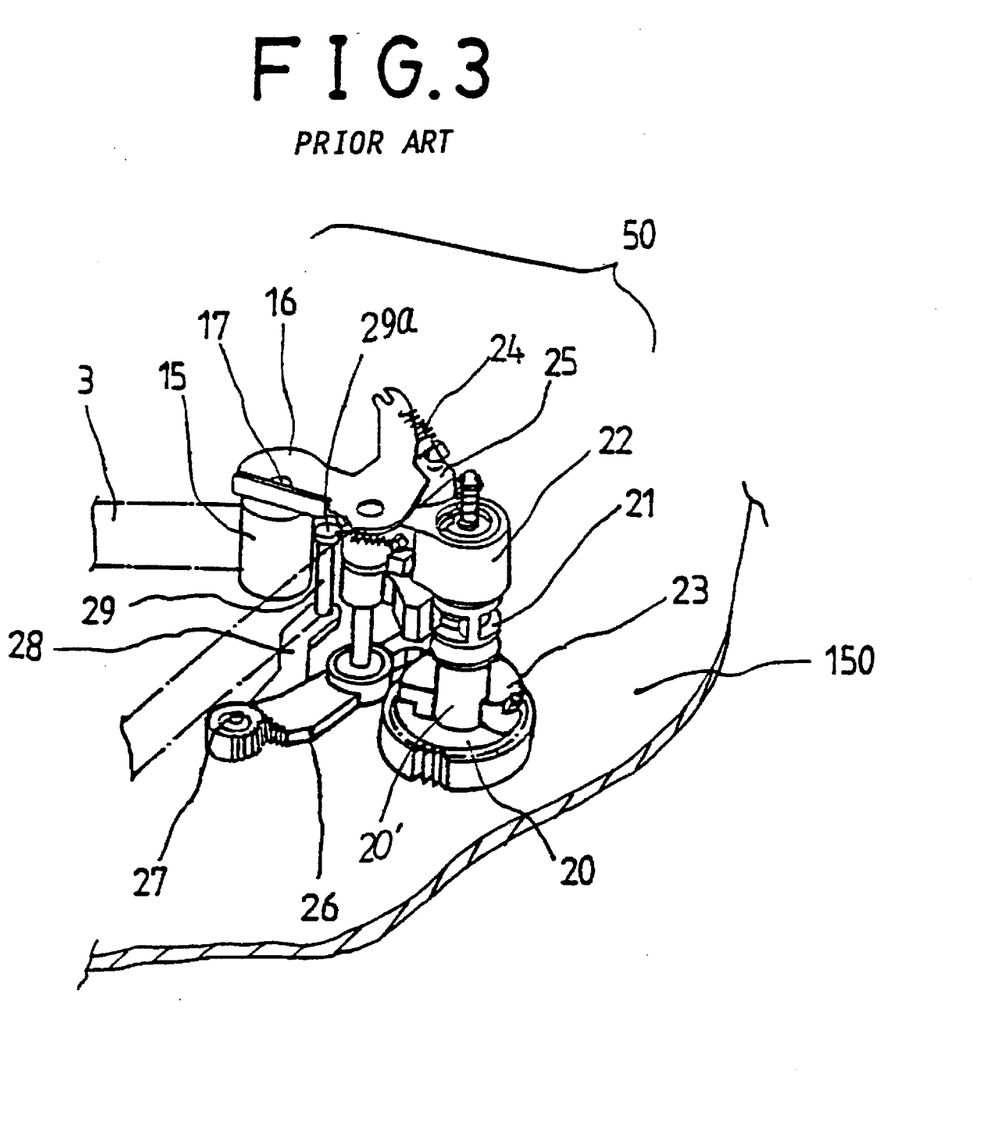
FIG. 3 is a perspective view showing a partial construction of a pinch roller assembly of a conventional video cassette tape recorder when a tape is loaded thereto.

In addition, FIG. 2A shows a position of a guide pole 29 when a cassette is not fed into the video cassette tape recorder body that is, any operation mode is not applied thereto. FIG. 2B shows a position of the guide pole 29 when the cassette is fed into the video cassette tape recorder body and then a tape thereof is being guided toward a pinch roller 15. FIG. 3 shows a position of the guide pole 29 when a tape loading operation is finished, so the tape 3 is position at the back of the pinch roller 15.

The construction of the conventional apparatus for guiding a tape in a video cassette tape recorder will now be explained with reference to FIGS. 2A to 2B through 3.

To begin with, a pinch roller assembly 50 includes a pinch gear 20 mounted on a predetermined portion of a stationary base plate 150 for receiving a predetermined rotation force from a motor (not shown) and transferring the rotation force to corresponding elements connected thereto. A pinch gear shaft 20' is fitted into the pinch gear 20. A semicircular cam 23 is formed on the pinch gear 20 in a form of surrounding the pinch gear shaft 20'. A cam groove 21 is formed on the outer circumferential surface of the pinch gear shaft 20'. An arm pinch 22 is rotatably mounted on the top of the pinch gear shaft 20'. A pinch lever 25 is mounted on the top of the pinch gear shaft 20'. One end of the pinch lever 25 is connected to one end of a pinch plate 16. A pinch roller 15 is mounted on the other end of the pinch plate 16. Here, a spring 24 is connected between the top of the pinch gear shaft 20' and a predetermined portion of the pinch plate 16.

Meanwhile, a take-up lever 26 is mounted on a predetermined portion of the stationary base plate 150. A pinch roller taking up/down shaft 18 is fitted to the central portion of the take-up lever 26, the top of which is connected to a predetermined portion of the pinch plate 16. Here, one end of the pinch roller taking up/down shaft 18 comes into slidable contact with the outer circumferential surface of the semicircular cam 23 and the other end thereof is intermeshed with the gear 27 integrally formed with a take-up arm 28 including a guide pole 29. Here, a guide pole head 29a is formed on the top of the guide pole 29 to prevent a tape 3 from drifting away from the guide pole 29 when the tape is running.

The operation of the conventional apparatus for guiding a tape in a video cassette tape recorder will now be explained with reference to FIGS. 1, 2A to 2B and 3.

To begin with, before a cassette is loaded into a video cassette tape recorder body, the take-up arm 28 stays near the pinch roller 15. At this state, when the cassette is loaded thereinto in accordance with a predetermined operation mode, the take-up arm 28 moves toward a take-up reel (not shown) and a supply reel (not shown) so as to guide the tape 3 toward the back of the pinch roller 15 by receiving a predetermined rotation force from the motor via the pinch gear 20 and the take-up lever 26. Here, the pinch roller 15 is directed to be raised up/down by a predetermined operation of the pinch gear and the cam groove 21. By the continued operation of the pinch gear 20 and the take-up lever 26, the tape 3 is engaged to the back of the pinch roller 15.

Meanwhile, when the tape 3 is ejected from the guide pole 29 and the guide pole head 29a, the take-up arm 28 rotates counterclockwise by a predetermined rotation force applied from the pinch gear 20, the cam 23, the take-up lever 26 and the gear 27. When the take-up arm 28 finishes rotating counterclockwise, the cassette is raised up so as to be unloaded from the take-up reel and the supply reel and at the same time the take-up arm 28 goes back toward the pinch roller 15.

However, when the take-up arm 28 goes back toward the pinch roller 15 after the cassette is raised up so as to be unloaded from the take-up reel and the supply reel, the tape 3 is caught at the guide pole head 29a and/or the top of the guide pole 29 because generally the guide pole head 29a has a larger diameter than that of the guide pole 29 in order to prevent the tape 3 from drifting away from the guide pole 29 when the tape 3 is running. In addition, due to the different timing between when the cassette is raised up from the take-up reel and the supply reel and when the take-up lever 26 goes back toward the pinch roller and the manufacturing variations in the corresponding parts, the tape 3 is from time to time caught at the guide pole 29 and/or the guide pole head 29a, whereby the tape 3 may be damaged or the video cassette tape recorder malfunction.

SUMMARY OF THE INVENTION

Accordingly, it is an object of the invention to provide an apparatus for guiding a tape in a video cassette tape recorder which does not involve the problems encountered in the conventional apparatus for guiding a tape in a video cassette tape recorder.

It is another object of the present invention to provide an improved apparatus for guiding a tape in a video cassette tape recorder capable of advantageously protecting a tape from being caught in a guide pole of a take-up arm during an ejection operation of a cassette.

To achieve the above objects, according to one aspect of the present invention, there is provided an apparatus for guiding a tape in a video cassette tape recorder, which includes a pinch gear rotatably mounted on a predetermined portion of a stationary base plate; an intermediate gear intermeshed with the pinch gear and mounted on a predetermined portion of the stationary base plate and driven by a force transferred from the pinch gear; a cam gear mounted on a predetermined portion of the stationary base plate and intermeshed with the intermediate gear and having a cam groove formed on the upper surface thereof and driven by a force transferred from the intermediate gear; a three-branched loading intermediate member, in which a center portion is pivoted at a predetermined portion of the stationary base plate, having a first branch end having an downwardly extended pin slidably fitted into and travelling along the cam groove for receiving a predetermined force from the cam gear, an inwardly curved second branch end and a third branch end having a geared portion; and a take-up arm in which one end thereof is provided with a guide pole and the other end thereof is provided with a semicircular activating bracket and pivoted at a predetermined portion of the stationary base plate.

According to another aspect of the present invention, the apparatus for guiding a tape in a video cassette tape recorder includes a pinch gear rotatably mounted on a predetermined portion of a stationary base plate; an intermediate gear intermeshed with the pinch gear and mounted on a predetermined portion of the stationary base plate and driven by force transferred from the pinch gear; a cam gear mounted on a predetermined portion of the stationary base plate and intermeshed with the intermediate gear and having a cam groove formed on the upper surface thereof and driven by a force transferred from the intermediate gear; a joint type loading intermediate lever member including a first link, a second link and a lever intermeshed with one of a pair of loading gears; and a take-up arm in which one end thereof is provided with a guide pole and the other end thereof is provided with a shaft having a shaft hole, a support and a protrusion.

DETAILED DESCRIPTION OF THE INVENTION

Figure 4:
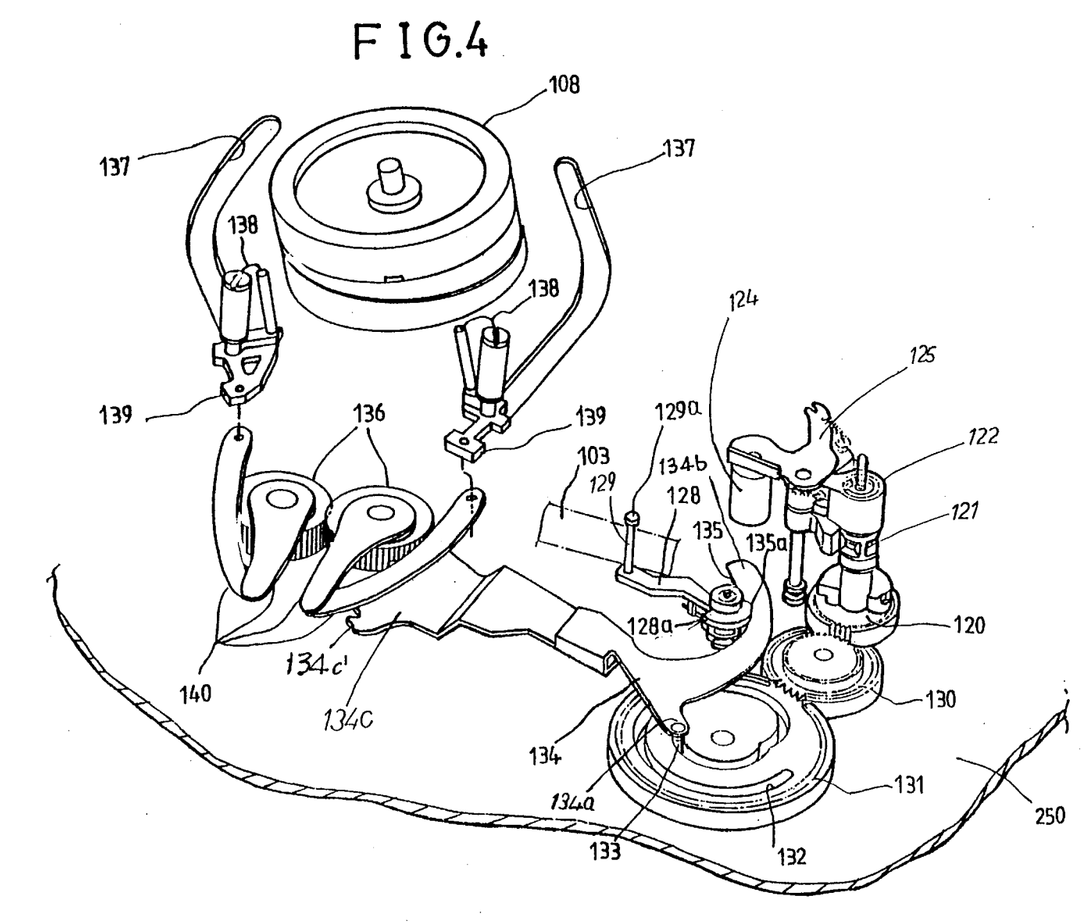
FIG. 4 is a perspective view showing a partial construction of a video cassette tape recorder according to a first embodiment of the present invention when a guide pole of a take-up arm is at an initial stage before a tape is guided toward a pinch roller.

FIG. 4 shows a first embodiment of an apparatus for guiding a tape in a video cassette tape recorder according to the present invention.

As shown in FIG. 4, a pinch gear 120 is mounted on a predetermined portion of a stationary base plate 250 for receiving a predetermined rotation a force from a motor (not shown) mounted on a predetermined portion of the stationary base plate 250 and for transferring the rotation a force to the corresponding elements. A cam groove 121 is formed on a pinch gear shaft (not shown) mounted on a predetermined portion of the pinch gear 120. An arm pinch 122 is mounted on the top of the pinch gear shaft. A pinch plate 125 is connected to the arm pinch 122. A rotary pinch roller 124 upwardly/downwardly moveable in accordance with the rotation of the cam groove 121 is rotatably mounted on a predetermined portion of the pinch plate 123.

Meanwhile, an intermediate gear 130 is mounted on a predetermined portion of the stationary base plate 250 and is drivingly intermeshed with the pinch gear 120 for receiving the rotation force therefrom and for converting the rotation direction. A cam gear 131 is mounted on a predetermined portion of the stationary base plate 250 and is drivingly intermeshed with the intermediate gear 130 for receiving the rotation force therefrom and for convening the rotation direction. Here, a cam groove 132, one end of which is inwardly eccentrically curved and the other end of which is outwardly eccentrically curved and the two ends of which does not meet each other, is formed on the upper surface of the cam gear 131. A three-branched loading intermediate member 134, in which the central portion thereof is pivoted at a predetermined portion of the stationary base plate 250, includes a first branch end 134a having a pin 133, a second branch end 134b having an activating section 135 and a recess 135a and a third branch end 134c having a gear section 134c' on the end thereof.

Meanwhile, a take-up arm 128, one end of which is pivoted at a predetermined portion of the stationary base plate 250, includes a guide pole 129 having a guide pole head 129a provided on the top thereof and a semicircular-shaped activation bracket 128a. In addition, a spring (not shown) is mounted on a reverse side of the portion where the take-up arm 128 is pivoted for rotating the take-up arm 128 counterclockwise when the tape 103 is ejected from the pinch roller 124.

A pair of loading gears 136 are mounted on a predetermined portion of the stationary base plate 250, one loading gear of which is rotatably intermeshed with the gear section 134c' of the third branch end 134c for reciprocatably driving a pair of tape guiding poles 138 connected between each end of the levers 140 and each connection member 139. Here, the tape guiding poles 138 reciprocatably travel along each loading path 137. Here, not described reference number 108 denotes a drum, and 103 denotes a tape.

Figure 5:
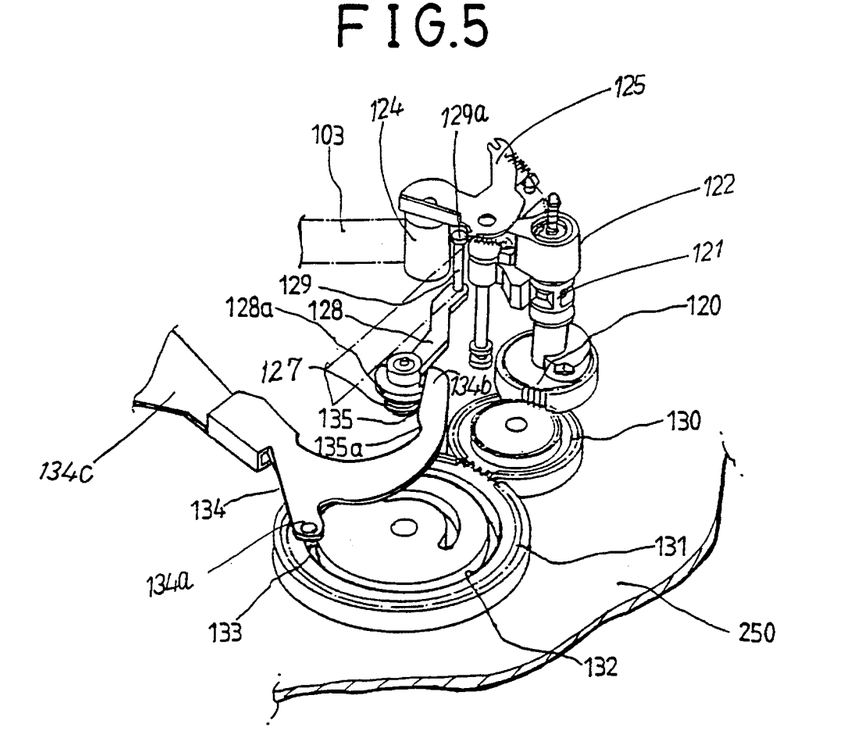
FIG. 5 is a perspective view showing a partial construction of an apparatus for guiding a tape in a video cassette tape recorder according to the first embodiment of the present invention when a tape is loaded behind the pinch roller.
Figure 6:
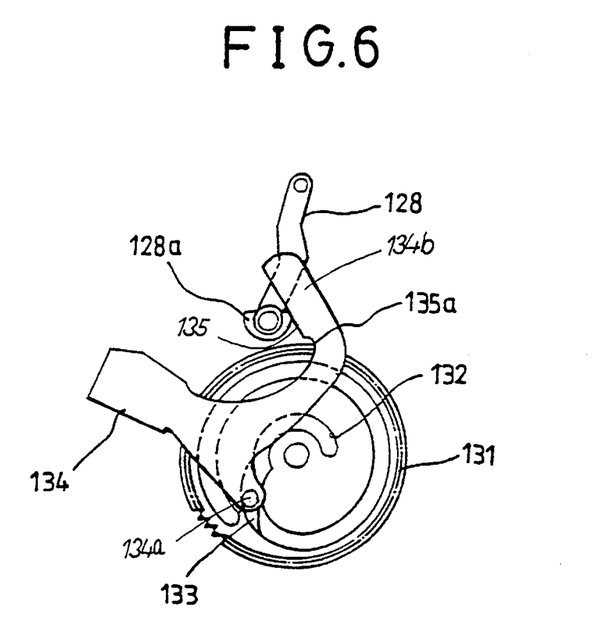
FIG. 6 is a top view showing a connection portion between a first branch end and a cam gear, and a second branch end and an activating bracket of an apparatus for guiding a tape in a video cassette tape recorder of a video cassette tape recorder according to the first embodiment of the present invention.

The operation of an apparatus for guiding a tape in a video cassette tape recorder according to a first embodiment according to the present invention will now be explained with reference to FIGS. 4 to 6.

To begin with, the take-up arm 128 is positioned at the place where the cassette is initially positioned onto a take-up reel (not shown) and a supply reel (not shown), in which the guide pole 120 is positioned in a predetermined place of the cassette (not shown) for advancing toward the pinch roller 124 in accordance with a predetermined operation mode. In addition, a tip of the activating bracket 128a is engaged to the recess 135a of the second branch end 134b.

In the above state, the pinch roller 120 rotates clockwise by the rotation force applied from the motor (not shown). The intermediate gear 130 intermeshed with the pinch gear 120 rotates counterclockwise by the rotation force applied from the pinch gear 120. The cam gear 131 rotates clockwise by the rotation force applied from the intermediate gear 130. At this time, the pinch roller 124 is raised up by a predetermined force applied from the cam groove 121. The pin 133 of the first branch moves far from the center of the cam gear 131 along the cam groove 132 of the cam gear 131. Thereafter, the second branch end 134b rotates clockwise and permits the activating bracket 128a to rotates clockwise, whereby the guide pole 129 is directed to move toward the pinch roller 124 along with the tape 103. At this time, since one tip of the semicircular activating bracket 128a is slidably tightly engaged to the recess 135a when the second branch end 134b starts rotating clockwise, the guide pole 129 of the take-up arm 128 becomes more easily rotatable. In addition, the spring (not shown) mounted on just a reverse side of the portion where the take-up arm 128 is pivoted is extended in a clockwise direction.

Meanwhile, when the second branch end 134b rotates clockwise, the third branch end 134c at the same time rotates clockwise and permits one of the loading gears 136 to rotate counterclockwise and the other thereof to rotate clockwise thereby forcing the tape guiding poles 138 to travel up along the loading paths 137 along with the tape 103.

When the tape loading operation is finished, the tape ejecting operation starts in accordance with a predetermined operation mode.

In accordance with the predetermined operation mode for ejecting the tape 103, the pinch gear 120 rotates counterclockwise by the rotation force applied from the motor and at the same time the pinch roller 124 is raised up by a predetermined force from the cam groove 121. The intermediate gear 130 rotates clockwise. The cam gear 131 rotates counterclockwise and then the second branch end 134b rotates counterclockwise, so the take up arm 128 rotates counterclockwise along with the tape 103 by the elastic force of the spring toward the initial state that is, where the cassette is initially placed into the take-up reel and the supply reel.

Meanwhile, as the second branch end 134b rotates counterclockwise, the third branch end 134c also rotates counterclockwise and one of the loading gears 136 rotates clockwise and the other thereof rotates counterclockwise and then the tape guiding poles 138 come down along the loading path 137 along with the tape 103 whereby the tape 103 is ejected from the drum 108.

At this time, the tape 103 is safely lifted from the guide pole 129 without being caught at the guide pole head 129a because the take-up arm 128 does not go back toward the pinch roller 124 after the tape 103 is ejected from the guide pole head 129a in comparison with the conventional arts that the take-up arm 128 always goes back toward the pinch roller after the tape 103 is ejected from the guide pole 129.

Figure 7:
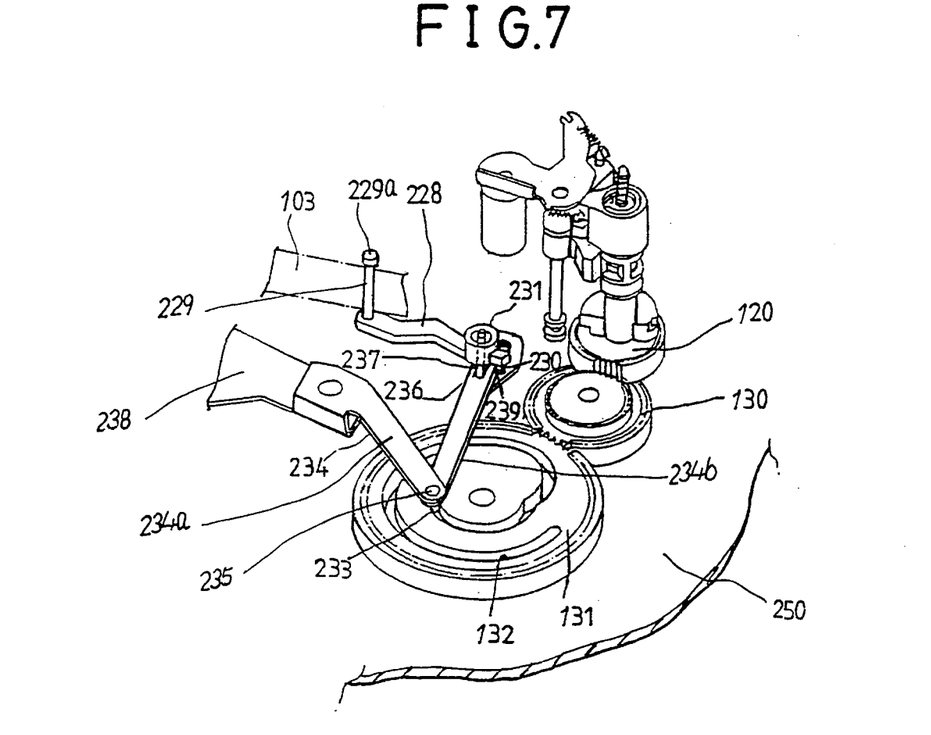
FIG. 7 is a perspective view showing a partial construction of an apparatus for guiding a tape in a cassette tape recorder of a video cassette tape recorder according to a second embodiment of the present invention when a guide pole of a take-up arm is at an initial stage before a tape is guided toward a pinch roller.
Figure 8:
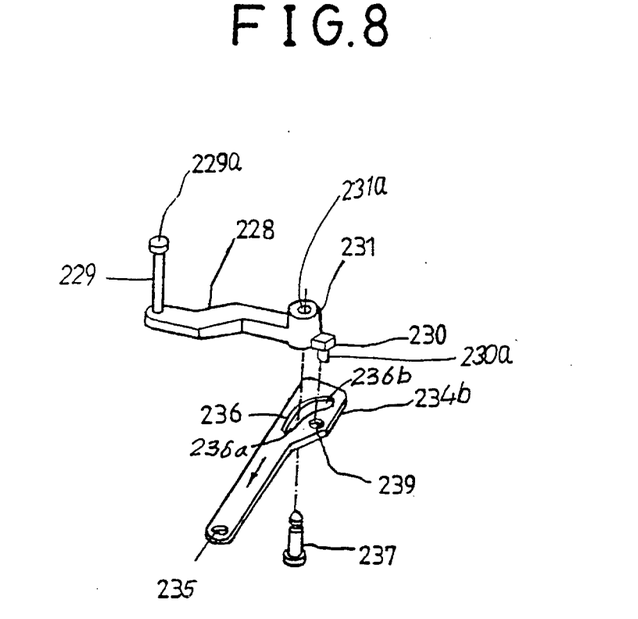
FIG. 8 is a perspective view showing a connection portion between a link and a take-up arm of an apparatus for guiding a tape in a video cassette tape recorder according to the second embodiment of the present invention.

FIGS. 7 and 8 show a second embodiment of an apparatus for guiding a tape in a video cassette tape recorder of a video cassette tape recorder according to the present invention.

As shown in FIGS. 7 and 8, the apparatus for guiding a tape in a video cassette tape recorder of the second embodiment has the same construction as in the first embodiment, so that only the construction that is different from the first embodiment will now be explained.

To begin with, instead of the three-branched loading intermediate member 134 of the first embodiment, a joint type loading intermediate member 234 having the same functions as in the three-branched loading intermediate member 134 is adapted in the second embodiment of the present invention. The joint type loading intermediate member 234, the central portion of which is pivoted at a predetermined portion of the stationary base plate 250, is provided with a first joint 234a, a second joint 234b and a lever 238. Here, the first link 234a and the second link 234b is mounted by a pivot 235 having a pivot extension 233 slidably fitted into the cam groove 132. The second link 234b includes an inwardly eccentrically curved quarter-circular activating groove 236 formed on one end thereof and a protrusion hole 239 formed closely adjacent to the activating groove 236 while maintaining the same distance between the inner circumferential curve of the activating groove 236 and the outer circumferential curve of the protrusion hole 239.

Meanwhile, there is provided a take-up arm 228 including a guide pole 229 formed one end thereof. Here, the guide pole 229 is provided with a guide pole head 229a formed on the top thereof for preventing the tape 103 from moving away from the guide pole 229. A shaft 231 including a shaft hole 231a is provided on the other end of the take-up arm 228. A support 230 is formed on a predetermined portion of the outer circumferential surface of the shaft 231 for supporting a downwardly extended protrusion 230. Here, the shaft hole 231a and the activating groove 236 is slidably connected by a pin 237 with each other. In addition, the protrusion 230a is rotatably fitted into the protrusion hole 239.

The operation of the apparatus for guiding a tape in a video cassette tape recorder according to the second embodiment of the present invention will now be explained.

To begin with, when the cam gear 131 rotates clockwise so as to load the tape toward the back of the pinch roller 124 by the rotation force applied from the motor via a pinch gear 120 and an intermediate gear 130 in accordance with a predetermined operation mode, the upper end of the second link 234b rotates clockwise and the lower end (the pivot 235) rotates clockwise, the shaft 231 is positioned at the upper end 236b of the activating groove 236, and at the same time, the tape-up arm 228 rotates about the pin 237 in accordance with the movement of the protrusion hole 239 into which the protrusion 230a is engaged and thus the guide pole 229 moves toward the back of the pinch roller 124. At this time, the pinch roller 124 is already lifted up by a predetermined force applied from the motor.

Meanwhile, when the tape 103 is ejected from the guide pole in accordance with a predetermined operation mode, the cam gear 131 rotates counterclockwise. Thereafter, the upper end of the second link 234b rotates counterclockwise, and the lower end (the pivot 235) rotate counterclockwise, so that the shaft 231 travels toward the lower portion 236a of the activating groove 236 and thus the guide pole 229 moves back toward the initial position that is, toward the take-up reel (not shown) and the supply reel (not shown). Thereafter, the tape 103 is taken out of the guide pole 229 without being caught at the guide pole head 229a.

That is, when the tape 103 is ejected from the guide pole 229, since the take-up arm 228 is positioned at the same place where the cassette is first placed onto the take-up reel and the supply reel and does not move toward the pinch roller 124 after the cassette is taken out of the video cassette tape recorder body, the tape 103 is not caught at the guide pole 229 and/or the guide pole head 229a compared with the conventional apparatus for guiding a tape in a video cassette tape recorder.

Accordingly, as described above, in the first and second embodiments according to the present invention, before the cassette is fed into the video cassette tape recorder, the guide pole 129 is always initially placed at the take-up reel and the supply reel installation portion. In addition, when the cassette is ejected from the take-up reel and the supply reel, the arm-take up does not go back toward the pinch roller 124, so that the tape is advantageously prevented from being caught at the guide pole and/or the guide pole head and thus tape damage and malfunction of the video cassette tape recorder may be prevented thereby.

What is claimed is:

1. An apparatus for guiding a tape in a video cassette tape recorder, comprising:

a pair of loading means driving a pair of tape ejecting members which extract a tape out of a cassette and wind said tape onto a drum;

a cam gear mounted on a first portion of a stationary base plate, the cam gear having a cam groove formed on an upper surface thereof and being driven by a force transferred from a drive means;

a three-branched intermediate loading member including a center portion pivoted at a second portion of the stationary base plate, a first branch end having a pin slidably fitted into and travelling along said cam groove for receiving a force from the cam gear, an inwardly curved second branch end and a third branch end having a geared portion drivingly engaged with one of said loading means to move said loading means; and a take-up arm having one end thereof provided with a guide pole to guide movement of said tape and at another end thereof provided with an activating bracket contacting said second branch of said three-branched intermediate loading member and pivotably mounted at the stationary base plate.

2. The apparatus of claim 1, wherein said cam groove is formed on said cam gear so that one end thereof is eccentrically curved in one direction and the other end thereof is eccentrically curved in another direction.

3. The apparatus of claim 1, wherein said geared portion of said third branch end is drivingly intermeshed with, one of a pair of loading gears mounted on a predetermined portion of the stationary base plate.

4. The apparatus of claim 1, wherein said second branch end includes a recess formed on a predetermined portion of the inner edge thereof.

5. The apparatus of claim 1, wherein said semicircular activating bracket includes a pair of tips of which one tip is engaged to a recess of the second branch end, whereby the take-up arm rotates clockwise when the second branch end rotates clockwise because said tip of the semicircular activating bracket is engaged to the recess.

6. The apparatus of claim 1, wherein said take-up arm is elastically biased to move the take-up arm in one direction.

7. A tape guiding apparatus, comprising:

a pair of loading means driving a pair of tape ejecting members which extract a tape out of a cassette and wind said tape onto a drum;

a cam gear mounted on a first portion of a stationary base plate, the cam gear having a cam groove formed on an upper surface thereof and being driven by a force transferred from a drive means;

an intermediate lever means including a first link having at one end thereof a pin slidably fitted into and travelling along said cam groove for receiving a force from the cam gear, a second link pivotably connected at one end thereof directly to said first link by said pin and at another end thereof having a groove and a protrusion hole; and a take-up arm having one end thereof provided with a guide pole to guide movement of said tape and at another end thereof provided with a shaft engaged in the groove of the second link of the intermediate lever means, a support and a protrusion engaged in the protrusion hole of the second link of the intermediate lever means, for being pivoted by said second link of said intermediate lever means.

8. The apparatus of claim 7, wherein said first link and said second link are connected by a pivot 235 having a pivot extension slidably fitted into said cam groove of said cam gear.

9. The apparatus of claim 7, wherein said second link includes an inwardly curved guiding groove.

* * * * *